(12) United States Patent
Liu et al.

(10) Patent No.: US 6,805,741 B1
(45) Date of Patent: Oct. 19, 2004

(54) READY-MIXED SETTING-TYPE COMPOSITION AND RELATED KIT

(75) Inventors: Qingxia Liu, Vernon Hills, IL (US); Kumar Natesaiyer, Grayslake, IL (US); Qiang Yu, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 10/400,270

(22) Filed: Mar. 27, 2003

(51) Int. Cl.$^7$ .............................................. C04B 11/00
(52) U.S. Cl. ...................... 106/785; 106/778; 106/781
(58) Field of Search ............................... 106/778, 781, 106/785

(56) References Cited

U.S. PATENT DOCUMENTS

| | | |
|---|---|---|
| 4,804,688 A | 2/1989 | Vassileff |
| 5,100,474 A | 3/1992 | Hawkins |
| 5,725,656 A | 3/1998 | Shimanovich et al. |
| 5,746,822 A | 5/1998 | Espinoza et al. |
| 5,779,786 A | 7/1998 | Patel |
| 6,228,163 B1 | 5/2001 | Espinoza et al. |
| 6,342,284 B1 | 1/2002 | Yu et al. |
| 6,387,172 B1 * | 5/2002 | Yu et al. ..................... 106/680 |
| 6,409,824 B1 * | 6/2002 | Veeramasuneni et al. ... 106/772 |

FOREIGN PATENT DOCUMENTS

| | | | |
|---|---|---|---|
| GB | 2199576 A | | 7/1988 |
| JP | 51-22719 A | * | 2/1976 |
| JP | 53-105525 A | * | 9/1978 |
| JP | 2003-147359 A | * | 5/2003 |
| WO | WO 01/81268 A2 | | 11/2001 |

OTHER PUBLICATIONS

Derwent Abstract No. 1977–58559Y, abstract of Japanese Patent Specification No. 52–080327 (Jul. 1977).*

Boisvert et al., "Hydration of Calcium Sulfate Hemihydrate ($CaSO_4 \cdot 1/2H_2O$) into Gypsum ($CaSO_4 \cdot 1/2H_2O$). The Influence of the Sodium Poly(acrylate)/surface Interaction and Molecular Weight," *Journal of Crystal Growth*, 220, 579–591 (2000). (no month).

Öner et al., "The influence of Polyelectrolytes Architecture on Calcium Sulfate Dihydrate Growth Retardation,"*Journal of Crystal Growth*, 186, 427–437 (1998). (no month).

* cited by examiner

*Primary Examiner*—Anthony J. Green
(74) *Attorney, Agent, or Firm*—John M. Lorenzen; David F. Janci; Leydig, Voit & Mayer, Ltd.

(57) ABSTRACT

A ready-mixed composition, which sets when mixed with an activator for the reaction of calcined gypsum with water to form set gypsum, is disclosed. The composition comprises water and calcined gypsum in a weight ratio of water to calcined gypsum of from about 0.15 to about 0.5, as well as a set preventer comprising a polyacrylic acid and/or a salt thereof. The composition has a viscosity of from about 5,000 centipoise to about 48,000 centipoise. Also disclosed is a kit that comprises separately packaged components. One of the components is a composition comprising calcined gypsum and a polyacrylic acid and/or a salt thereof, and, optionally, water. Another component of the kit comprises an activator which, when mixed with the composition, permits the composition to set.

41 Claims, No Drawings

US 6,805,741 B1

READY-MIXED SETTING-TYPE COMPOSITION AND RELATED KIT

TECHNICAL FIELD OF THE INVENTION

The present invention relates generally to flowable, setting-type gypsum compositions. More particularly, the invention relates to a flowable, ready-mixed composition comprising calcined gypsum and a set preventer, wherein the composition sets when mixed with an activator for the reaction of calcined gypsum with water to form set gypsum.

BACKGROUND OF THE INVENTION

Set gypsum (calcium sulfate dihydrate) is a well-known material that is used to make many types of products and that is included commonly in many types of products. Generally, gypsum-containing products are prepared by forming a mixture of calcined gypsum (i.e., calcium sulfate hemihydrate and/or calcium sulfate anhydrite) and water, and optionally other components, as desired. The mixture typically is cast into a pre-determined shape or onto the surface of a substrate. The calcined gypsum reacts with the water to form a matrix of crystalline hydrated gypsum, i.e., calcium sulfate dihydrate. It is the desired hydration of calcined gypsum that enables the formation of an interlocking matrix of set gypsum, thereby imparting strength to the gypsum structure in the gypsum-containing product.

In many instances, it is desirable to provide a ready-mixed setting-type composition that includes calcined gypsum pre-mixed with water, a set preventer, and other additives as desired. These compositions are generally packaged in a container such as a pail, can, bucket, carton, and the like so that little or no additional water is required to be added to the gypsum pre-mix for use, for example, at the job site. Ready-mixed compositions are designed to prevent setting until the user adds an activator for the reaction of calcined gypsum with water to form set gypsum.

Ready-mixed compositions are well known for use as joint compounds, commonly used to join abutting wallboard or to patch wallboard. U.S. Pat. No. 5,746,822, for example, describes ready-mixed gypsum-based compositions that include non-calcium bearing phosphates as set retarders. According to the '822 patent, tetra sodium pyrophosphate provides the most long-lasting set retardation effect of the non-calcium bearing phosphates and is used in conjunction with citric acid. The ready-mixed compositions of the '822 patent are not fully satisfactory for many applications other than as joint compounds because they are formulated to be relatively viscous and they have relatively low strength.

In addition, U.S. Pat. No. 5,779,786 discloses a ready-mixed joint compound that includes a retarder in the form of a polymer composition including acrylic acid and acrylamide monomer units. As examples, the '786 patent discloses a copolymer of acrylic acid and acrylamide or a blend of a homopolymer of acrylic acid and a homopolymer of an acrylamide. The ready-mixed formulations of the '786 patent are designed to be relatively viscous to avoid bleeding of water and settling of particulate. The ready-mixed compositions of the '786 patent also do not exhibit sufficient strength for many applications other than joint compound.

There is a continuing need in the art for ready-mixed compositions that are formulated to have lower viscosity and higher strength than ready-mixed joint compounds. For example, in many applications, it would be desirable to have a ready-mixed composition that is flowable before activator is added to the composition, and which remains flowable for some period of time even after activator is added, so that the user has sufficient "workable" time to use the composition for its intended purpose.

Flowable ready-mixed compositions would be desirable for use in a variety of interior and exterior applications, as one of ordinary skill in the art will appreciate. By way of example, flowable ready-mixed compositions would be useful in a number of plaster applications including dental applications, building plaster, machinable plaster, and the like. For example, dental plaster is useful for casting dimensionally accurate reproductions of a portion of an oral cavity or extraoral facial structure as a positive impression formed from a polymer such as alginate that forms a negative impression. In addition, building plaster may be in the form of, for example, veneer plaster (e.g., DIAMOND® brand interior finish plaster, commercially available from the United States Gyspum Company) for finishing interior wallboards.

Flowable ready-mixed compositions also would have use in forming molds made of plaster that are used in casting pottery figurines and the like using pressure casting or slip casting techniques known in the art. In addition, ready-mixed flowable compositions also would be useful for solid casting applications, such as, for example, statuary and architectural pieces such as moldings, as well as rotational casting applications. For example, rotational casting is utilized to form hollow products, such as, for example, lamp posts and the like. Flowable ready-mixed compositions also would be useful in spray applications, including glass fiber reinforced gypsum compositions that may be used in making decorative architectural pieces.

Accordingly, it will be appreciated from the foregoing that there is a need in the art for ready-mixed, setting-type compositions that have a relatively low viscosity so that they are flowable, and preferably that remain flowable even after activator is added. It will be appreciated also that there is a need in the art for such a ready-mixed composition in which setting is avoided in the absence of activator for a relatively long time such that the composition has a long shelf-life. It will be appreciated further that there is a need in the art for such a ready-mixed composition in which the solid particulate in the composition does not settle and where water does not bleed. The invention provides such a ready-mixed composition. These and other advantages of the present invention, as well as additional inventive features, will be apparent from the description of the invention provided herein.

BRIEF SUMMARY OF THE INVENTION

The present invention provides a composition that sets when mixed with an activator for the reaction of calcined gypsum with water to form set gypsum. The composition comprises water and calcined gypsum in a weight ratio of water to calcined gypsum of from about 0.15 to about 0.5. The composition also comprises a set preventer comprising a polyacrylic acid and/or a salt thereof. The composition has a viscosity of from about 5,000 centipoise to about 48,000 centipoise. The ready-mixed composition of the present invention has a long shelf-life and will set after the mixing of activator therewith. In some embodiments, the ready-mixed composition exhibits sufficient flowability even after mixture with an activator to permit the activated composition to be applied and formed to a desired shape.

The present invention also provides a kit comprising separately packaged components. One of the components is a composition comprising calcined gypsum and a polyacrylic acid and/or a salt thereof, and, optionally, water. Another component comprises an activator which, when mixed with the composition, allows the composition to set.

The invention may best be understood with reference to the following detailed description of the preferred embodiments.

DETAILED DESCRIPTION OF THE INVENTION

The present invention provides a ready-mixed, setting-type composition, and a kit comprising separately packaged components. The composition comprises water, calcined gypsum, and a set preventer comprising a polyacrylic acid and/or a salt thereof. The calcined gypsum can be in the form of calcium sulfate alpha hemihydrate, calcium sulfate beta hemihydrate, calcium sulfate anhydrite, and combinations thereof. One or more additional components, such as, for example, plasticizer, chelating agent, pH modifier, defoamer, foaming agent, reinforcing polymer, anti-freeze agent, suspension aid, bactericide, fungicide, and/or thickener can be added to the ready-mixed composition of the invention, as desired.

The composition is "ready-mixed" in preferred embodiments so that a user does not need to add water to the composition to use the composition. However, in some embodiments, the composition may be dry such that water is added by the user, if desired. Activator is added to the ready-mixed composition when it is desired to initiate setting of the calcined gypsum to an interlocking matrix of set gyspum, typically at a job site. Thus, preferably, a kit in accordance with the present invention comprises a ready-mixed composition packaged separately from the activator.

In accordance with the present invention, in the absence of activator, the ready-mixed composition does not set even over extended periods of time, such that it has a long shelf-life. In this respect, the ready-mixed composition preferably does not set for at least about 60 days without addition of activator, more preferably, at least about 90 days, even more preferably, at least about 175 days, still more preferably at least about 1 year.

In preferred embodiments, the weight ratio of water to calcined gypsum in the ready-mixed composition is from about 0.15 to about 0.5, preferably, from about 0.2 to about 0.35, and even more preferably, from about 0.2 to about 0.25. In achieving the desired weight ratios of water to calcined gypsum, the calcined gypsum preferably is present in an amount of from about 50% to about 80% by weight of the composition, more preferably, in an amount of from about 65% to about 75% by weight of the composition. The water preferably is present in an amount of from about 15% to about 30% by weight of the composition, more preferably, in an amount of from about 20% to about 25% by weight of the composition.

The weight ratios of water to calcined gypsum as described are particularly desirable because they enhance the compressive strength and density of the set composition after activator is added and the interlocking matrix of set gypsum is formed. In this respect, in preferred embodiments, after activator is added and the composition is set, the product has a compressive strength of at least about 1,000 psi, more preferably, at least about 1,200 psi, even more preferably, at least about 1,500 psi, still more preferably, at least about 2,500 psi, and even more preferably, at least about 3,000 psi. In some embodiments, the compressive strength of the product can be about 7,000 psi or even higher. The density of the composition after setting preferably is at least about 90 lb/ft$^3$ (e.g., from about 90 lb/ft$^3$ to about 130 lb/ft$^3$), more preferably, from about 100 lb/ft$^3$ to about 130 lb/ft$^3$, even more preferably, from about 102 lb/ft$^3$ to about 110 lb/ft$^3$.

In accordance with the present invention, the ready-mixed composition of the invention exhibits a relatively low viscosity such that it is suitably flowable. By "flowable," it is meant that it can be poured into a mold or sprayed using a spraying machine. Such flow characteristics are achieved when the composition has a viscosity in a range of from about 5,000 centipoise to about 48,000 centipoise, more preferably, from about 5,500 centipoise to about 45,000 centipoise, and even more preferably from about 5,500 centipoise to about 40,000 centipoise.

In preferred embodiments, after activator is added to the composition, it remains flowable. For example, in some embodiments, the composition remains flowable for at least about 0.25 hours after activator is added, more preferably, the composition is flowable for a period of time of from about 0.25 hours to about 6 hours after activator is added, even more preferably, the composition is flowable for a period of time of from about 0.25 hours to about 3 hours after activator is added, and still more preferably, the composition is flowable for a period of time of from about 0.25 hours to about 1.5 hours after activator is added.

Ready-mixed compositions having the preferred viscosities according to the present invention, and which preferably are flowable before and after addition of activator, are suitable for use in any of a number of different interior or exterior applications, such as, for example, plaster, spray formulations, solid casting, rotational casting, hand lay-up formulations, and the like. Examples of plaster applications include dental plaster, building plaster, veneer plaster, machinable plaster, and the like. Spray applications include, for example, large scale model making and the like. Exemplary solid casting applications include statuary, architectural moldings, and the like. Examples of rotational casting applications include hollow articles such as lamp posts and the like. Different viscosities within the preferred ranges described herein may be suitable for different applications, as will be appreciated by one of ordinary skill in the art. For example, hand lay-up compositions preferably have a viscosity on the higher end of the preferred range to permit their application by hand (e.g., on a horizontal or vertical surface), typically in alternating layers with glass fiber to form a laminated composite.

In accordance with the present invention, the composition comprises a polyacrylic acid and/or a salt thereof as a set preventer. While not wishing to be bound by any particular theory, it is believed that the polyacrylic acid and/or salt thereof acts as a set preventer because the carboxyl groups of the polyacrylic acid and/or salt thereof bond at nucleation sites on the crystal structure of the calcined gypsum. In this respect, the polyacrylic acid and/or salt thereof is believed to envelop the calcined gypsum so that it cannot react with water such that hydration is blocked and cannot occur.

The polyacrylic acid and/or salt thereof can be unsubstituted or substituted, for example, with an alkyl such as ethyl, methyl, and the like. Illustrative of the polyacrylic acid and/or salt thereof suitable for use in the present invention are polyacrylic acid, polyethacrylic acid, polymethacrylic acid, sodium polyacrylate, potassium polyacrylate, sodium polyethacrylate, potassium polyethacrylate, sodium polymethacrylate, potassium polymethacrylate, and the like, and combinations or copolymers thereof. A commercial example of a salt of polyacrylic acid that may be used in the practice of the invention is Tamol 1254, commercially available from Rohm and Haas Company. Preferably, the polyacrylic acid and/or the salt thereof has a molecular weight at an intermediate range of from about 1,000 daltons to about 4,500 daltons. It is believed that polyacrylic acids and/or salts thereof having higher molecular weights are less conducive to set prevention because the length of the polymeric chains are believed to be too long such that they are sterically hindered from coating on nucleation sites of the gypsum crystals and inhibiting reaction with water, while it is believed that lower molecular weight polyacrylic acids and/or salts thereof are less conducive to set prevention because there are not enough carboxylic functional groups to adequately cover the nucleation sites on the gypsum crystal surface and prevent it from reacting with the water. More preferably, the polyacrylic acid and/or salt thereof has a molecular weight of from about 1800 daltons to about 2500 daltons, even more preferably from about 1800 daltons to about 2200 daltons.

The desired set prevention, strength, viscosity, and suspension of the ready-mixed composition occurs without requiring a polyacrylamide, calcium carbonate, tetrasodium pyrophosphate, and/or citric acid. Thus, in preferred embodiments, the ready-mixed composition is essentially free of polyacrylamide, calcium carbonate, tetrasodium pyrophosphate, and/or citric acid such that the desired set prevention, compressive strength, viscosity and suspension of the ready-mixed composition occurs in their absence.

Surprisingly, despite the relatively low weight ratio of water to calcined gypsum used in achieving the interlocking matrix of set gypsum of desirable compressive strength and density, the inventive ready-mixed composition can be formulated to achieve the desired flowability and low viscosity even though the polyacrylic acid and/or salt thereof coats the calcined gypsum particles to form a chemical barrier between the calcined gypsum surface and water, thereby preventing formation of calcium sulfate dihydrate crystals. In this respect, it is surprising that the flow of the composition can be enhanced even where the inorganic gypsum particles are coated with the organic set prevention agent according to the invention. Even though nucleation sites on the gypsum crystals are occupied by the set preventer of the invention, the desired viscosity and flowability, for example, through the use of plasticizer as discussed herein below, can be achieved.

When initiation of setting is desired, typically by a user at a job-site, activator is added. As such, activator is packaged separately from the ready-mixed composition in a preferred kit embodiment according to the invention. It is believed that the activator acts to detach the preventer from the calcined gypsum crystals so that water can react with the calcined gypsum and setting can take place. As will be appreciated by one of ordinary skill in the art, the type of activator that is selected can vary depending upon the desired setting time. In some embodiments, a short setting time, for example from about 1 minute to about 10 minutes, is desirable, such as with spray formulations. However, in many other applications, a longer setting time, for example, from about 10 minutes to about 360 minutes, is desired so that the composition after activator is added provides sufficient workable time for the user, as would be typically useful in some applications, such as solid casting, rotational casting, hand lay-up, and the like.

Thus, in some embodiments, activators are selected that provide a short setting time. Examples of such activators include, but are not limited to, aluminum sulfate, sulfuric acid, hydrochloric acid, sodium hydrogen sulfate, potassium hydrogen sulfate, potassium aluminum sulfate, calcium sulfate dihydrate, and the like, or combinations thereof. However, in many applications, zinc sulfate is a preferred activator because its rate of overcoming the set preventer is very slow but can be increased by additional additives including, for example, a chelating agent such as an amine chelating agent. Thus, the rate of setting can be controlled with the selection of a zinc sulfate activator. The more chelating agent that is added, the shorter the resultant setting time. Accordingly, the use of a zinc sulfate activator in conjunction with an additive such as an amine chelating agent can accommodate longer working times, if desired.

The activator is added in any amount sufficient to achieve setting of the ready-mixed composition upon addition thereto in a desired amount of time. For example, the activator can be provided in an amount of from about 0.5% to about 6% by weight of the ready-mixed composition, more preferably, in an amount of from about 3% to about 5% by weight of the ready-mixed composition. In preferred embodiments, the activator is provided in aqueous solution. For example, the activator can be included in the aqueous solution in an amount of from about 5% to about 50% by weight of the solution, more preferably, in an amount of from about 10% to about 33% by weight of the solution.

Chelating agent optionally can be included in some embodiments. For example, in embodiments where zinc sulfate is selected as the activator, chelating agent preferably is added to the activator and/or to the ready-mixed composition, to help control the setting time. In this respect, activator comprising zinc sulfate can be tailored to achieve setting in any amount of time from about 5 minutes to about 360 minutes in accordance with preferred embodiments of the present invention. It has been found that adjusting the pH of the ready-mixed composition may further control the setting time.

The chelating agent preferably is provided in any suitable amount, such as, for example, in an amount of from about 0.1% to about 0.5% by weight of the ready-mixed composition. Preferably, the weight ratio of set preventer to chelating agent is from about 1.2:1 to about 6:1, preferably, 2:1 to about 6:1.

The chelating agent can be in any suitable form. Examples of suitable chelating agents include, for example, ammonium hydroxide, triethanolamine, 2-amino-2-methyl-1-propanol, and the like, and combinations thereof. Amine chelating agents are particularly desirable because they contain amino groups, which are basic and thus will participate in acid-base reactions with acidic carboxyl groups on the polyacrylic acid and/or salt thereof, thereby assisting the zinc sulfate in detaching the set preventer from the calcined gypsum crystals, and thus controlling setting time. Preferred amine chelating agents also chelate with divalent or trivalent metal ions in the ready-mixed composition, such as iron ions that might be present as an impurity, thereby inhibiting coagulation and flocculation of particles and thus providing some enhancement of fluidity. However, in some embodiments where it is necessary to significantly increase fluidity to achieve the desired viscosity as set forth herein, a plasticizer will also be required. It is believed that the chelating agent functions by speeding up the action of the activator by complexing with the set preventer so that the set preventer is inhibited from attaching to the calcined gypsum crystals.

A preferred amine chelating agent is 2-amino-2-methyl-1-propanol, such as AMP 95, commercially available from Dow Chemical Company, because it also acts as a pH modifier. In this respect, preferably, the pH of the ready-mixed composition of the invention is from about 5.5 to about 10, more preferably, from about 8 to about 9, especially where a zinc sulfate activator is used. In this respect, it has been found that shorter setting times are achieved at the upper end of the preferred pH range while longer setting times are achieved at the lower end of the desired pH range.

The ready-mixed composition of the invention can be used in both interior and exterior applications. One or more additives can be added to the ready-mixed composition to facilitate the desired viscosity, and other optional additives may be added to achieve desired physical characteristics in the final set product, such as, for example, flexural strength, abuse resistance (e.g., chip resistance), water resistance, flame resistance, and the like, or combinations thereof.

The desired viscosity can be achieved, for example, by including one or more plasticizers in the ready-mixed composition. Plasticizers that are suitable for use in gypsum slurries are well known in the art and any can be selected so long as they do not adversely affect any of the other ingredients in the composition, as would be appreciated by one of ordinary skill in the art. Preferably, plasticizer is provided to enhance fluidity and thus inhibits particle flocculation and allows for a reduction in the water demand of the ready-mixed composition while still achieving a desired fluidity and viscosity. The plasticizer, particularly in combination with a reinforcing polymer such as a latex as described herein below, preferably also increases flexibility and abuse resistance, particularly chip resistance, of the final product.

An example of desirable plasticizer is a polyether polycarboxylic compound or salt thereof, and the like, or blends or copolymers thereof, such as, for example, polyether polycarboxylate, sodium salt. Commercial examples of desirable plasticizer include, but are not limited to, ETHACRYL 6-3070, which is a polyether polycarboxylate, sodium salt commercially available from Lyondell Chemical Company, Newtown Square, Pa., as well as Melflux materials, which are commercially available from Degussa. More than one plasticizer may be employed in accordance with the present invention, as will be appreciated by one of ordinary skill in the art. It is noteworthy that naphthalene sulfonates and melamine formaldehyde resin plasticizers are less preferred plasticizers because they do not sufficiently enhance fluidity when used alone. In some embodiments, the ready-mixed composition is substantially free of naphthalene sulfonates and melamine formaldehyde resin plasticizers such that the desired viscosity according to the invention is achieved in their absence.

The plasticizer is present in any amount suitable for achieving a desired viscosity, such as, for example, an amount of from about 0.2% to about 0.8% by weight of the ready-mixed composition, preferably an amount of from about 0.4% to about 0.7% by weight of the ready-mixed composition.

Optionally, if desired, wetting agent, suspension aid, and/or thickener can be included in the composition. Wetting agents, suspension aids, and thickeners that are suitable for use in gypsum slurries are well known in the art and any can be selected so long as they do not adversely affect any of the other ingredients in the composition, as would be appreciated by one of ordinary skill in the art. Wetting agents enhance wettability of the ready-mixed composition by reducing surface tension such that the solid particles can be wet, while also enhancing the ability of the ready-mixed composition to be applied on a substrate surface. For example, the wetting agent can be in the form of nonyl phenol ethoxylate, commercially available as Vanwet 9N9 by Van Waters and Rogers Company, and/or di-2-ethylhexyl sulphosuccinate, sodium salt, commercially available as Hydropalat 875 (also referred to as Nopcosant-L) from Cognis Corporation. The wetting agent may be present in any amount sufficient to enhance fluidity. For example, the wetting agent can be present in an amount of from about 0.1% to about 1% by weight of the ready-mixed composition, preferably, in an amount of from about 0.2% to about 0.5% by weight of the ready-mixed composition.

An example of a suspension aid suitable for use in the composition of the present invention is a xanthum gum, such as Keltro C 617, commercially available from CPKelco Co. The suspension aid is present in an amount sufficient to inhibit settling of particulate and bleeding of water. For example, the suspension aid can be present in an amount of from about 0.01% to about 0.2% by weight of the ready-mixed composition, preferably, in an amount of from about 0.02% to about 0.1% by weight of the ready-mixed composition.

In some embodiments, thickener can optionally be added to raise viscosity, if desired. The thickener can be provided in the ready-mixed composition directly in some embodiments, but can also be separately packaged from the ready-mixed composition. By illustration, the thickener can be included with the activator in a second package or it can be added in a third package separate from both the ready-mixed composition and the activator. Thickener provided in a separate package may be desirable in some embodiments where the user wishes to adjust the viscosity on-site, as desired. Inclusion of alkaline swellable thickener directly in the ready-mixed composition is particularly desirable at higher pH, for example, a pH of 7 or higher, to enhance suspension.

Examples of thickeners suitable for use in gypsum compositions are well known in the art. For example, any of Alco Gums SL-117, L511, and L520, which are acrylic and amine type copolymers commercially available from National Starch and Chemical Company, Bridgewater, N.J., can be used as thickening agents. Alco Gum SL-117 is particularly desirable in embodiments where thickener is included directly in the ready-mixed composition, while Alco Gums L511 and L520 can be used in embodiments comprising separate packaging. If present, the thickener is included in the ready-mixed composition in an amount sufficient to achieve a desired viscosity. For example, in some embodiments, the thickener is present in an amount of from about 0.2% by weight to about 3% by weight of the ready-mixed composition, more preferably, in an amount of from about 0.5% by weight to about 2% by weight of the ready-mixed composition.

Defoamer optionally may be added. For example, defoamer may be used to minimize air bubble formation in applications where the composition is subject to agitation as in the case where the composition, either before or after addition of activator, is poured into a mold such as in solid casting or rotational casting applications. Such air bubbles are undesirable in some embodiments because they may cause formation of air voids in the final product, which would compromise the strength and appearance of the final product. In applications where the composition is not as susceptible to air bubble formation, such as spray applications, defoamer can be excluded from the composition. Defoamers for use in gypsum slurries are well known in the art. By way of example, the defoamer can be in the form of DeeFo 542, commercially available from Ultra Additives, Inc., Paterson, N.J. DeeFo 542 is a mixture comprising petroleum distillates, synthetic wax, the reaction product of silicon dioxide and an organosiloxane copolymer, as well as solvent-refined heavy and light paraffins. The defoamer can be present in any amount sufficient for inhibiting bubble formation. For example, the defoamer can be present in an amount of from about 0.1% to about 1% by weight of the ready-mixed composition, preferably, in an amount of from about 0.2% to about 0.4% by weight of the ready-mixed composition.

If desired, foaming agent can be included optionally, especially in embodiments where decreased strength is not a concern and where a lower density product is desired. The use of foaming agents in gypsum slurries is well known in the art, such as described in, for example, U.S. Pat. Nos. 5,683,635 and 6,342,284. For example, if present, the foaming agent can be present in an amount of from about 0.1% to about 1% by weight of the ready-mixed composition, preferably, in an amount of from about 0.2% to about 0.4% by weight of the ready-mixed composition.

In some embodiments, reinforcing polymer is included in the ready-mixed composition of the invention to enhance water resistance, abuse resistance, and/or flexural strength where one or more of these characteristics is desirable. Reinforcing polymers useful for gypsum compositions are well known and any can be used so long as they do not adversely impact any of the other ingredients in the ready-mixed compositions of the invention, as would be appreciated by one of ordinary skill in the art. By way of example, the reinforcing polymer can be in the form of an acrylic latex, which includes polyacrylic acid latexes. Polyacrylic acid latexes can be unsubstituted or substituted, wherein substitutions include, for example, an alkyl such as methyl, ethyl, and the like. Salts of polyacrylic acids are also useful, as well as blends or co-polymers of any of the foregoing. A commercial example of a desirable reinforcing polymer in accordance with some embodiments of the invention is VF-812 latex (also identified as Forton polymer), which is a methacrylic type of water based latex, commercially available from Engineered Polymer Solutions, Marengo, Ill. As will be appreciated by one of ordinary skill in the art, other suitable reinforcing polymers include, for example, polyurethanes, poly-styrene butadienes, polyvinyl acetates, and the like, or blends or copolymers of any of these. While such reinforcing polymers are particularly desirable to include in ready-mixed compositions for exterior or interior applications that benefit from enhanced water resistance, it is also desirable to include such polymers in ready-mixed composition for use in some interior or exterior applications where the reinforcing polymer's enhancement of abuse resistance (e.g., chip resistance) and/or flexural strength is beneficial.

If included, the reinforcing polymer preferably is present in any amount sufficient to enhance water resistance, abuse resistance, and/or flexural strength. In exterior applications, for example, the reinforcing polymer can be present in an amount of from about 30% to about 35% by weight of the ready-mixed composition. In indoor applications, lower amounts of the reinforcing polymer are desirable in embodiments where flammability is a concern. In this respect, because the reinforcing polymer may adversely increase flame spread when used in high amounts, the reinforcing polymer preferably is present in an amount of about 24% or less by weight of the ready-mixed composition in applications where flame spread is a concern.

While sufficient set prevention can be provided by the polyacrylic acid and/or salt thereof, if desired, a portion of the polyacrylic acid and/or salt thereof optionally could be replaced with one or more organic phosphonic compounds. However, the use of one or more organic phosphonic compounds would not be sufficient as set preventer alone. Thus, while not required, in some embodiments, the ready-mixed composition of the invention comprises an organic polyphosphonic compound or a mixture of organic polyphosphonic compounds. Any suitable organic polyphosphonic compound may be included, if desired, as described, for example, in U.S. patent application Ser. No. 09/557,721. For example, the organic polyphosphonic compound may be selected from aminotri(methylene-phosphonic acid), aminotri(methylene-phosphonic acid)pentasodium salt, 1-hydroxyethylidene-1,1-diphosphonic acid, 1-hydroxyethylidene-1,1-diphosphonic acid tetrasodium salt, diethylenetriamine penta(methylene phosphonic acid) pentasodium salt, diethylenetriamine penta(methylene phosphonic acid)trisodium salt, hexamethylene diamine tetra (methylene phosphonic acid), hexamethylene diamine tetra (methylene phosphonic acid)potassium salt, and combinations thereof. The organic polyphosphonic compound or mixture of organic polyphosphonic compounds is present in any suitable amount sufficient to provide the desired set prevention, such as for example, an amount of from about 0.1% to about 0.5% by weight of the composition.

Optionally, in some embodiments, an anti-freeze agent can be provided to reduce the freezing point of the composition and to enhance freeze-thaw stability. Any suitable anti-freeze agent may be used. Suitable anti-freeze agents for aqueous systems are well known, such as, for example, glycol derivatives such as ethylene glycol and propylene glycol, as well as methoxypropanol, chloride salts such as sodium chloride and magnesium chloride, and the like, or combinations of any of the foregoing. If present, the anti-freeze agent preferably is included in an amount sufficient to reduce the freezing temperature to a desired point and/or to enhance freeze-thaw stability. For example, in some embodiments, the anti-freeze agent is present in an amount of from about 0.1% to about 0.9% by weight of the ready-mixed composition, preferably, in an amount of from about 0.2% to about 0.8% by weight of the ready-mixed composition.

In some embodiments, a biocide such as fungicide and/or bactericide optionally may be included in the ready-mixed composition of the invention. Examples of suitable fungicides and biocides are well known in the art. By way of example, Troysan 174, commercially available from Troy Chemical Company, may be selected as a bactericide, while a tributyltin benzoate solution such as Fungitrol 158, commercially available from Fritz Chemical Company, may be selected as a fungicide. If present, the bactericide and/or fungicide preferably are present in an amount sufficient to inhibit growth of bacteria or fungi in the ready-mixed composition. For example, if included, each of the bactericide and fungicide is present in an amount of from about 0:01% to about 0.1% by weight of the ready-mixed composition, preferably, in an amount of from about 0.03% to about 0.1% by weight of the ready-mixed composition.

It is to be noted that ready-mixed compositions according to the invention preferably are packaged so that the ready-mixed composition does not come into direct contact with a metal container, which could otherwise corrode when in contact with the aqueous ready-mixed composition. Thus, in embodiments where a metal container such as steel is used, it is beneficial to line the metal, for example with an epoxy coated liner or other plastic that does not adversely interact with the ready-mixed composition.

The following examples further illustrate the present invention but should not be construed as in any way limiting its scope. The weight percentages are by weight of the composition, unless otherwise indicated.

EXAMPLE 1

Liquid Gypsum Architectural Solid Cast (Interior)

A ready-mixed composition suitable for interior architectural solid cast applications was prepared using the formulation set forth in Table I:

TABLE I

| Ingredient | Weight % |
|---|---|
| Water | 19.20 |
| Set Preventer (Tamol 1254) | 0.48 |
| Anti-freeze Agent (Ethylene Glycol) | 0.96 |
| Calcium Sulfate Alpha Hemihydrate (Hydrocal C-base, United States Gypsum Company) | 76.81 |
| Plasticizer (Ethacryl 6-3070) | 0.73 |
| Wetting Agent (Van Wet 9N9) | 0.30 |
| Wetting Agent (Nopcosant-L) | 0.30 |
| Bactericide (Troysan 174) | 0.03 |
| Fungicide (Fungitrol 158) | 0.03 |
| Amine Chelating Agent (AMP 95) | 0.03 |
| Thickener (AlcoGum SL-117) | 0.71 |
| Amine Chelating Agent (AMP 95) | 0.20 |
| Defoamer (Deefo 542) | 0.19 |
| Suspension Aid (Keltro C-617) | 0.02 |
| Total | 100 |

The composition was prepared by adding each ingredient in the listed order into a high shear mixer at about 800 rpm. Mixing took place for a time of from 5 minutes to about 10 minutes per ingredient until each ingredient was properly mixed. The composition had a viscosity of about 45,000 centipoise. The composition was packaged in a 5 gallon pail or 50 gallon drum. The composition had not set after three months at room temperature.

After addition of set activator, the composition could be set in as short as 5 minutes and as long as 120 minutes depending on the activator type and dosage, as well as mixing intensity. The set composition had a compressive strength of 5,000 to 7,000 psi, depending on the activator type and dosage.

EXAMPLE 2

Liquid Gypsum Architectural Hand Layup (Interior)

A ready mixed composition suitable for interior architectural hand layup applications was prepared as described in Example 1 with the ingredients set forth in Table 2:

TABLE 2

| Ingredient | Weight % |
|---|---|
| Water | 19.28 |
| Set Preventer (Tamol 1254) | 0.48 |
| Anti-freeze Agent (Ethylene Glycol) | 0.96 |
| Calcium Sulfate Alpha Hemihydrate (Hydrocal C-base, United States Gypsum Company) | 77.10 |
| Plasticizer (Ethacryl 6-3070) | 0.41 |
| Wetting Agent (Van Wet 9N9) | 0.30 |

TABLE 2-continued

| Ingredient | Weight % |
|---|---|
| Wetting Agent (Nopcosant-L) | 0.30 |
| Bactericide (Troysan 174) | 0.03 |
| Fungicide (Fungitrol 158) | 0.03 |
| Amine Chelating Agent (AMP 95) | 0.03 |
| Thickener (AlcoGum SL-117) | 0.71 |
| Amine Chelating Agent (AMP 95) | 0.15 |
| Defoamer (Deefo 542) | 0.19 |
| Suspension Aid (Keltro C-617) | 0.02 |
| Total | 100 |

The composition had a viscosity of about 40,000 to 45,000 centipoise. The composition was packaged in a 5 gallon pail or 50 gallon drum. The composition had not set after three months at room temperature.

After addition of set activator, the composition could be set in as short as 5 minutes and as long as 120 minutes, depending on the activator type and dosage, as well as mixing intensity. The set composition had a compressive strength of 5,000–7,000 psi depending on the activator type and dosage.

EXAMPLE 3

Liquid Composite Architectural Solid Cast (Exterior)

A ready mixed composition suitable for exterior architectural solid cast applications was prepared as described in Example 1 with the ingredients set forth in Table 3:

TABLE 3

| Ingredient | Weight % |
|---|---|
| Reinforcing Polymer Mix (VF-812) | 32.20 |
| Set Preventer (Tamol 1254) | 0.40 |
| Calcium Sulfate Alpha Hemihydrate (Hydrocal C-base, United States Gypsum Company) | 67.08 |
| Amine Chelating Agent (AMP 95) | 0.32 |
| Defoamer (DEEFO 542) | 0.19 |
| Total | 100 |

It is to be noted that the VF-812 is a 50/50 mix of water and reinforcing polymer. The composition had a viscosity of about 5,000 centipoise. The composition was packaged in a 5 gallon pail or 50 gallon drum. The composition had not set after three months at room temperature.

After addition of set activator, the composition set in as short as 5 minutes and as long as 120 minutes depending on the activator type and dosage, as well as mixing intensity. The set composition had a compressive strength of about 2,500–3,500 psi.

EXAMPLE 4

Liquid Composite Sprayable Formulation (Exterior)

A ready mixed composition suitable for exterior sprayable applications was prepared as described in Example 1 with the ingredients set forth in Table 4:

TABLE 4

| Ingredient | Weight % |
| --- | --- |
| Reinforcing Polymer Mix (VF-812) | 32.31 |
| Set Preventer (Tamol 1254) | 0.40 |
| Calcium Sulfate Alpha Hemihydrate (Hydrocal C-base, United States Gypsum Company) | 67.29 |
| Total | 100 |

It is to be noted that the VF-812 is a 50/50 mix of water and reinforcing polymer. The composition had a viscosity of about 5,000 centipoise. The composition was packaged in a 5 gallon pail or 50 gallon drum. The composition had not set after three months at room temperature.

After addition of set activator, the composition set in a couple of minutes. The set composition had a compressive strength of about 2,500–3,500 psi.

All of the references cited herein, including patents, patent applications, and publications, are hereby incorporated in their entireties by reference.

While this invention has been described with an emphasis upon preferred embodiments, it will be apparent to those of ordinary skill in the art that variations of the preferred embodiments may be used and that it is intended that the invention may be practiced otherwise than as specifically described herein. Accordingly, this invention includes all modifications encompassed within the scope of the invention as defined by the following claims.

What is claimed is:

1. A composition comprising:
   a) water;
   b) calcined gypsum; and
   c) a set preventer selected from the group consisting of a polyacrylic acid, a salt of polyacrylic acid, and combinations thereof;
   wherein the weight ratio of water to calcined gypsum in the composition is from about 0.15 to about 0.5, and wherein the composition has a viscosity of from about 5,000 centipoise to about 48,000 centipoise, and said composition forms an interlocking matrix of set gypsum when mixed with an activator for the reaction of calcium sulfate hemihydrate with water to form set gypsum.

2. The composition of claim 1, wherein the composition is essentially free of one or more of the following:
   i) a polyacrylamide;
   ii) calcium carbonate;
   iii) tetrasodium pyrophosphate; and
   iv) citric acid.

3. The composition of claim 1, wherein the composition has a shelf life of at least about 90 days.

4. The composition of claim 1, wherein, upon addition of activator and formation of an interlocking matrix of set gypsum, the composition has a compressive strength of at least about 1,500 psi.

5. The composition of claim 1, wherein the composition has a pH of from about 5.5 to about 10.

6. The composition of claim 1, wherein the composition has a pH of from about 8 to about 9.

7. The composition of claim 1, wherein water is present in an amount of from about 15% to about 30% by weight of the composition.

8. The composition of claim 1, wherein the calcined gypsum is alpha calcium sulfate hemihydrate.

9. The composition of claim 1, further comprising a reinforcing polymer.

10. The composition of claim 1, wherein the reinforcing polymer is selected from the group consisting of a polyurethane, poly-styrene butadiene, acrylic latex or salt thereof, polyvinyl acetate, and combinations thereof.

11. The composition of claim 1, wherein the calcined gypsum is present in an amount of from about 50% to about 85% by weight of the composition.

12. The composition of claim 1, wherein the set preventer has a molecular weight of from about 1,800 daltons to about 2,200 daltons.

13. The composition of claim 1, wherein the set preventer is selected from the group consisting of sodium polyacrylate, potassium polyacrylate, polyacrylic acid, and combinations thereof.

14. The composition of claim 1, wherein the set preventer is present in an amount of from about 0.45% to about 1.2% by weight of the composition.

15. The composition of claim 1, wherein the composition further comprises a chelating agent.

16. The composition of claim 15, wherein the chelating agent is selected from a group consisting of 2-amino-2-methyl-1-propanol, ammonium hydroxide, triethanolamine, and combinations thereof.

17. The composition of claim 15, wherein the chelating agent is present in an amount of from about 0.1% to about 0.5% by weight of the ready-mixed composition.

18. The composition of claim 15, wherein the weight ratio of set preventer to chelating agent is from about 1.2:1 to about 6:1.

19. The composition of claim 1, further comprising an organic polyphosphonic compound or a mixture of organic polyphosphonic compounds.

20. The composition of claim 19, wherein the calcined gypsum is beta calcium sulfate hemihydrate.

21. The composition of claim 19, wherein the organic polyphosphonic compound is selected from the group consisting of aminotri(methylene-phosphonic acid), aminotri(methylene-phosphonic acid)pentasodium salt, 1-hydroxyethylidene-1,1-diphosphonic acid, 1-hydroxyethylidene-1,1-diphosphonic acid tetrasodium salt, diethylenetriamine penta(methylene phosphonic acid) pentasodium salt, diethylenetriamine penta(methylene phosphonic acid)trisodium salt, hexamethylene diamine tetra (methylene phosphonic acid), hexamethylene diamine tetra (methylene phosphonic acid)potassium salt, and combinations thereof.

22. The composition of claim 19, wherein the organic polyphosphonic compound or mixture of organic polyphosphonic compounds is present in an amount of from about 0.1% to about 0.5% by weight of the composition.

23. The composition of claim 1, wherein the composition is flowable for at least 0.25 hours after being mixed with activator.

24. The composition of claim 1, wherein the set preventer is selected from the group consisting of a polyethacrylic acid, polymethacrylic acid, polyethacrylate, polymethacrylate, and combinations thereof.

25. The composition of claim 1, further comprising plasticizer.

26. The composition of claim 25, wherein said plasticizer is a polyether polycarboxylic compound, a salt of a polyether polycarboxylic compound, or combinations thereof.

27. The composition of claim 26, wherein the plasticizer is a polyether polycarboxylate sodium salt.

28. The composition of claim 25, wherein the plasticizer is present in an amount of from about 0.2% to about 0.8% by weight of the ready-mixed composition.

29. A kit comprising separately packaged components comprising:
   a) the composition of claim 1; and
   b) an activator component.

30. The kit of claim 29, wherein the activator component comprises one or more of the following: zinc sulfate, aluminum sulfate, sodium hydrogen sulfate, sulfuric acid, hydrochloric acid, potassium hydrogen sulfate, potassium aluminum sulfate, or combinations thereof.

31. The kit of claim 29, wherein either or both of (a) and (b) comprises a chelating agent.

32. The kit of claim 31, wherein the activator component comprises zinc sulfate and/or calcium sulfate dihydrate.

33. The kit of claim 29, further comprising (c) thickener.

34. A kit comprising separately packaged components comprising:
   a) a composition comprising (i) calcium sulfate hemihydrate, and (ii) set preventer selected from the group consisting of a polyacrylic acid, a salt of polyacrylic acid, and combinations thereof; and
   b) an activator component;
wherein either or both of (a) and (b) further comprises a chelating agent.

35. The kit of claim 34, wherein the chelating agent is selected from the group consisting of 2-amino-2-methyl-1-propanol, ammonium hydroxide, triethanolamine, and combinations thereof.

36. The kit of claim 34, further comprising (c) thickener.

37. A composition comprising:
   a) water;
   b) calcined gypsum;
   c) set preventer selected from the group consisting of a polyacrylic acid a salt of polyacrylic acid, and combinations thereof; and optionally, one or more of the following ingredients:
   d) plasticizer,
   e) chelating agent,
   f) pH modifier,
   g) defoamer,
   h) reinforcing polymer,
   i) foaming agent,
   j) antifreeze agent,
   k) suspension aid,
   l) bactericide,
   m) fungicide, or
   n) thickener;
   wherein the weight ratio of water to calcined gypsum in the composition is from about 0.15 to about 0.5, and wherein the composition has a viscosity of from about 5,000 centipoise to about 48,000 centipoise, and said composition forms an interlocking matrix of set gypsum when mixed with an activator for the reaction of calcium sulfate hemihydrate with water to form set gypsum.

38. A kit comprising separately packaged components comprising:
   a) the composition of claim 37; and
   b) an activator component which, when mixed with the composition, permits the composition to set.

39. A composition comprising:
   a) calcined gypsum;
   b) a polyacrylic acid and/or a salt thereof;
   c) a chelating agent; and
   (d) an organic polyphosphonic compound or a mixture of organic polyphosphonic compounds, wherein said composition forms an interlocking matrix of set gypsum when mixed with water and an activator for the reaction of calcium sulfate hemihydrate with water to form set gypsum.

40. The composition of claim 39, further comprising water.

41. The composition of claim 39, wherein the chelating agent is selected from a group consisting of 2-amino-2-methyl-1-propanol, ammonium hydroxide, triethanolamine, and combinations thereof.

* * * * *